United States Patent
Takeda

(10) Patent No.: US 7,035,184 B2
(45) Date of Patent: Apr. 25, 2006

(54) OPTICAL DISK APPARATUS WITH OPTIMAL ERASING SPEED

(75) Inventor: Naoto Takeda, Tokyo (JP)

(73) Assignee: TEAC Corporation, Musashino (JP)

(*) Notice: Subject to any disclaimer, the term of this patent is extended or adjusted under 35 U.S.C. 154(b) by 548 days.

(21) Appl. No.: 10/405,755

(22) Filed: Mar. 31, 2003

(65) Prior Publication Data

US 2003/0185118 A1    Oct. 2, 2003

(30) Foreign Application Priority Data

Apr. 1, 2002    (JP) ............................. 2002-098681

(51) Int. Cl.
*G11B 7/00*    (2006.01)
(52) U.S. Cl. ................ 369/47.39; 369/47.53
(58) Field of Classification Search .......... 369/47.39, 369/47.53
See application file for complete search history.

(56) References Cited

U.S. PATENT DOCUMENTS

| | | | | |
|---|---|---|---|---|
| 4,841,512 A | * | 6/1989 | Kubota et al. ............ | 369/53.36 |
| 6,842,412 B1 | * | 1/2005 | Ushiyama et al. ........ | 369/47.53 |
| 2002/0141308 A1 | * | 10/2002 | Matsumoto .............. | 369/47.53 |
| 2003/0151993 A1 | * | 8/2003 | Wai William et al. ... | 369/47.53 |
| 2004/0136305 A1 | * | 7/2004 | Kato et al. ............... | 369/59.11 |

FOREIGN PATENT DOCUMENTS

JP    10188286    7/1998

* cited by examiner

*Primary Examiner*—Hoa T. Nguyen
*Assistant Examiner*—Christopher R. Lamb
(74) *Attorney, Agent, or Firm*—Christensen O'Connor Johnson Kindness PLLC

(57) ABSTRACT

An optical disk apparatus which can record data by means of transition between an amorphous state and a crystalline state and enables overwriting of data. Test data are recorded into a test area of an optical disk by radiating a laser beam of recording power. The recorded test data are erased by radiating a laser beam of erasing power to the test area of the optical disk while a rotational speed of the optical disk is varied. An erasure performance for erasing the test data is computed at each rotational speed, and the erasure performance is compared with the predetermined threshold value. The higher the rotational speed, the lower the erasure performance. From among the rotational speeds at which superior erasure performance is achieved, the maximum rotational speed is selected. Data are written over the data area of the optical disk at the thus-selected maximum rotational speed.

21 Claims, 7 Drawing Sheets

OPTICAL DISK APPARATUS WITH OPTIMAL ERASING SPEED

BACKGROUND OF THE INVENTION

1. Field of the Invention

The invention relates to an optical disk apparatus, and more particularly, to an optical disk apparatus of phase change type utilizing transition from an amorphous state to a crystalline state.

2. Related Art

There has hitherto been known an optical disk apparatus of phase change type which effects transition of a recording film from an amorphous state to a crystalline state and records data by utilization of a change arising between the reflectivity of the film in the amorphous state and that of the film in the crystalline state. More specifically, the entire surface of the recording film is crystallized as an initial state through heating. A laser beam of recording power is radiated onto the recording film, thereby heating the film to a melting point or more. The film is then rapidly cooled to bring the crystalline state to the amorphous state, thereby recording data. A laser beam of erasing power is radiated onto the recording film to a crystallization temperature or more. The film is then gradually cooled so as to return the amorphous state to the crystalline state, thereby erasing the data.

In such an optical disk apparatus of phase change type, overwriting of data is also performed by modulation of the power of the laser beam. Specifically, overwriting operation is realized by superimposing a recording power pulse on an erasing power pulse at the time of recording of data, by erasing existing recorded data through use of the preceding erasing power pulse, and by recording data through use of the subsequent recording power pulse. Normally, the recording power is optimized through OPC (Optimum Power Control) which uses a predetermined area of an optical disk; that is, a PCA (Power Calibration Area), in consideration of variations in the sensitivity of the recording film of the optical disk or other factors. The erasing power is set so as to assume a constant proportion to the optimized recording power.

With a view toward improvement in a signal-to-noise ratio, overwriting requires complete erasure of existing recorded data through use of the laser beam of erasing power. Consequently, in addition to the method for setting the erasing power so as to assume a constant proportion to the recording power, a method for optimizing the erasing power itself in accordance with an optical disk has also been proposed. In short, there has been proposed a method for setting the erasing power independent of the recording power.

For example, Japanese Patent Laid-Open Publication No. Hei 10-188286 describes a method for setting optimal erasing power by recording a test signal on a certain track of an optical disk, tracing the track with a DC laser beam of erasing power (Pe), and examining the level of erasure of a marked portion (corresponding to an amorphous area) of the reproduced signal. If the erasing power is too low, unerased data still remain on the track. In contrast, if the erasing power is too high, a transition to the amorphous state arises again. For these reasons, optimal erasing power is selected from the range of intermediate power between the too-low erasing power and the too-high erasing power.

However, demand for high-speed recording has recently been growing, and there arises a problem of optimization of the erasing power alone sometimes failing to meet such a demand for high-speed recording. For example, in relation to an optical disk apparatus which is of quadruple-speed as defined by the specifications, many users desire to perform recording operation at a speed faster than quadruple-speed (4×); for example, octuple-speed (8×) or decuple-speed (10×). Recording of data at a speed faster than quadruple-speed is favorable for the optical disk apparatus. When overwriting is performed through use of optimized erasing power, erasure of existing recorded data at quadruple-speed may be ensured, but thorough erasure of data at a speed higher than quadruple-speed is not ensured. Unerased data may arise, which in turn degrades recording quality. The reason for this is that the higher a recording speed (i.e., the higher the rotational speed of a disk), the shorter the time during which a recording film is to be heated, thereby posing difficulty in crystallization of the film, which would otherwise be caused when the film is held at a temperature higher than or equal to the crystallization temperature for a given period of time.

SUMMARY OF THE INVENTION

The invention provides an optical disk apparatus which optimizes an overwriting speed, thereby enabling high-speed recording.

The invention provides an optical disk apparatus which enables overwriting of data, comprising: means for recording test data in a predetermined area of an optical disk; means for erasing the test data by changing a rotational speed of the optical disk; means for setting an optimal rotational speed in accordance with a level of erasure of the test data when the rotational speed has been changed; and means for overwriting of data into a data area of the optical disk at the optimal rotational speed. The test data are erased by changing the rotational speed of the optical disk, and the rotational speed is determined on the basis of the level of erasure of the test data. As a result, erasure performance is ensured even at the time of overwriting operation, thereby maintaining overwriting quality.

In one embodiment of the invention, the means for erasing test data erases the test data by changing the rotational speed of the optical disk in two steps or more including at least a standard rotational speed, and the means which performs setting sets the optimal rotational speed by comparing, with a threshold value, at least a level of erasure obtained at a rotational speed other than the standard rotational speed.

The invention also provides an optical disk apparatus which records data by means of transition between an amorphous state and a crystalline state, comprising: a spindle motor for rotationally driving an optical disk; a pickup which records test data in a predetermined area of the optical disk by means of radiating a laser beam of recording power to the area and erases the test data by means of radiating a laser beam of erasing power; and a controller which changes a rotational speed of the optical disk by controlling the spindle motor, sets an optimal rotational speed by comparing, with a predetermined allowable value, levels of erasure which are obtained by erasing the test data with the pickup while the rotational speed of the optical disk is changed in a plurality of steps, and controls the spindle motor so as to achieve the optimal rotational speed.

In another embodiment of the invention, the pickup writes data over the data area of the optical disk which is rotationally driven at the optimal rotational speed, through use of a recording pulse formed by superimposing a pulse of the recording power onto a pulse of the erasing power.

The invention will be more clearly comprehended by reference to the embodiments provided below. However, the scope of the invention is not limited to those embodiments.

DETAILED DESCRIPTION OF THE EMBODIMENT OF THE INVENTION

An embodiment of the invention will be described hereinbelow by reference to the drawings.

<Basic Configuration>

Figure 1:
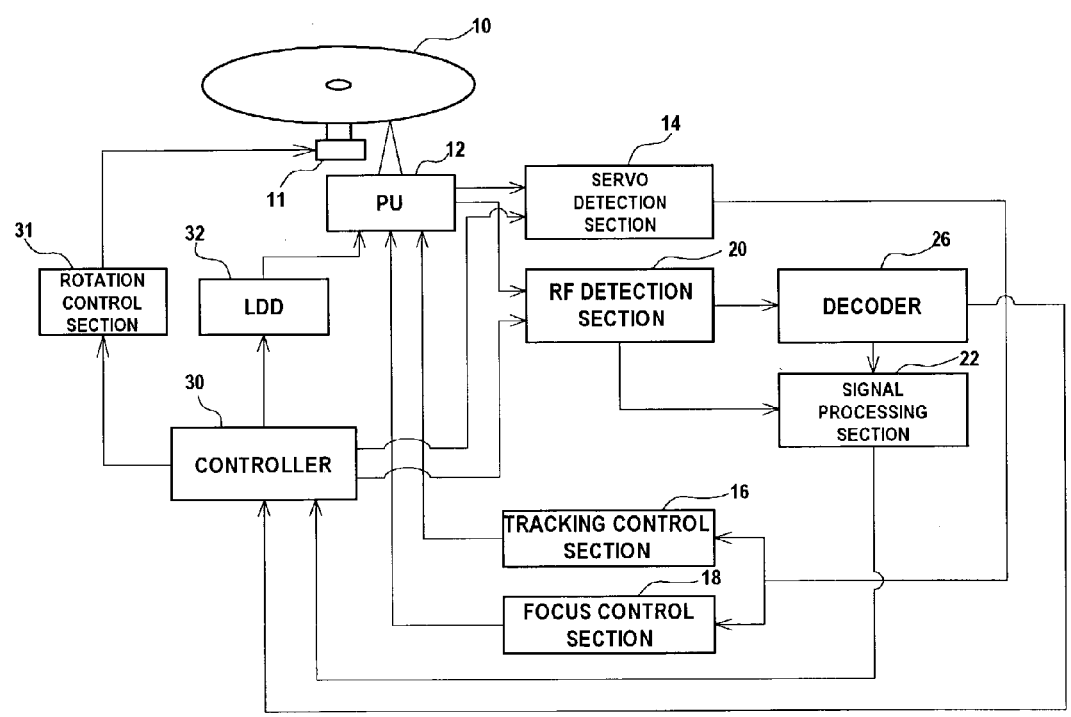
FIG. 1 is a configuration block diagram of an optical disk apparatus.

FIG. 1 shows a configuration block diagram of an optical disk apparatus of phase change type according to an embodiment of the invention. An optical disk 10 constituting a CD-RW, a DVD-RW, a DVD-PAM, or the like, is rotationally driven by a spindle motor 11. The spindle motor 11 is controlled by a rotation control section 31 so as to achieve a predetermined rotational speed. In the embodiment, the rotational speed is not constant and is optimized for each optical disk 10.

A pickup (PU) 12 is disposed so as to oppose the optical disk 10 and includes a laser diode (LD) for radiating a laser beam onto the surface of the optical disk 10. The laser diode is driven by a laser diode drive circuit (LDD) 32. When recording data on the optical disk 10, the laser diode radiates a laser beam formed by superimposing a recording power pulse on an erasing power pulse. The surface of the optical disk 10 is changed from an amorphous state to a crystalline state by the erasing power preceding to the recording power, thereby erasing existing recorded data. The surface of the optical disk 10 is then changed from the crystalline state to the amorphous state by means of the subsequent recording power. The pickup 12 has a photodetector for converting a laser beam reflected from the optical disk 10 into an electric signal and outputs a reproduced signal to a servo detection section 14 and an RF detection section 20.

The servo detection section 14 produces a tracking error signal and a focus error signal from a signal output from the pickup 12, and outputs a tracking error signal to a tracking control section 16 and a focus error signal to a focus control section 18. The tracking control section 16 drives the pickup 12 in the direction crossing tracks of the optical disk 10 in accordance with the tracking error signal, thereby bringing the pickup 12 into an on-track state. The focus control section 18 drives the pickup 12 in a focusing direction in accordance with the focus error signal, thereby bringing the pickup 12 into an on-focus state. When a four-way divided photodetector is used as the photodetector, a tracking error signal is produced from a difference detected by the detector, which is divided into sub-sections in the radial direction of the optical disk 10, by means of a differential push-pull method. A focus error signal is produced from a diagonally-summated difference output from the four-way divided photodetector by means of an astigmatic method. As a matter of course, the tracking error signal and the focus error signal may be produced by another method.

The RF detection section 20 produces a reproduced RF signal by amplifying a signal output from the pickup 12 and outputs the reproduced RF signal to a signal processing section 22 and a decoder 26.

The signal processing section 22 attempts to optimize recording power by performing an optimum power control (OPC) operation and computes an erasure ratio from the level of the reproduced RF signal in order to compute an optimum recording speed. The thus-computed erasure ratio is output to a controller 30. During the OPC operation, the power of a laser beam output from a laser diode (LD) is set to the recording power in a predetermined area of the optical disk 10; that is, a power calibration area (PCA), and test data are recorded by sequentially changing the recording power through a plurality of steps. The test data are recorded in respective frames of the PCA by varying the recording power from, e.g., 8.0 mW to 15.0 mW in increments of 0.5 mW. The test data may assume a data length of 3T or a data length of 3T to 14T. The test data may be a certain fixed pattern or a random pattern. After the test data have been recorded on the respective frames of the PCA by means of sequentially changing the recording power, the laser beam originating from the LD is set to predetermined reproduction power, thereby reproducing the test data and evaluating reproduction quality of the resultantly-reproduced signal. A $\beta$-value, jitter, a $\gamma$-value, or a modulation factor "m" is employed for reproduction quality. Although these evaluation parameters are well known, brief descriptions of them are provided below. Under the assumption that the peak level of an RC-coupled, reproduced RF signal is taken as A and the bottom level of the same signal is taken as B, the $\beta$-value is defined as $\beta=(A-B)/(A+B)$. Jitter is a phase difference between a signal into which the reproduced RF signal has been binarized and a synchronizing clock signal. Under the assumption that the peak level of a certain data length of the reproduced RF signal (e.g., 11T) is taken as C and the bottom level of the data length is taken as D, the modulation factor "m" is defined as "m"=$(C-D)/(C+D)$. The $\gamma$-value is the rate of change of the modulation factor "m." When the OPC operation is performed, the signal processing section 22 computes at least one of those evaluation parameters and outputs the thus-computed evaluation parameter to the controller 30. Here, jitter is detected by the decoder 26 to be described later, and the thus-detected jitter is output to the controller 30. The evaluation parameter is computed for each level of recording power. For instance, $\beta 1$, which is the $\beta$-value, is computed at a recording power of 8.0 mW, and $\beta 2$ is computed at a recording power of 9.0 mW. The controller 30 selects optimum recording power from the evaluation parameters computed for each recording power. For example, the $\beta$-values computed for each recording power are compared with a target $\beta$-value. The recording power which attains the $\beta$-value closest to the target $\beta$-value is selected as optimal recording power. The recording power which attains the target $\beta$-value may be computed through use of a linear interpolation method. Moreover, the erasure ratio is defined as a ratio of the level of a reproduced RF signal obtained after erasure to the level of a reproduced RF signal obtained before erasure. The thus-computed erasure ratio is supplied to the controller 30. The signal processing section 22 detects only the level of the reproduced RF signal and outputs the thus-detected level to the controller 30. The controller 30 may be configured so as to compute a β-value and an erasure ratio from the value of the level input to the controller 30.

The decoder 26 has an equalizer and a binarizer. The decoder 26 binarizes a predetermined frequency of the reproduced RF signal; specifically, the amplitude of a 3T signal, through boosting, demodulates the thus-binarized signal, and outputs the resultantly-demodulated data to the controller 30. Demodulation operation is performed by producing a synchronizing clock signal through use of an unillustrated PLL circuit and using the thus-produced synchronizing clock signal. The demodulated data output to the controller 30 are output to an unillustrated higher-level apparatus, such as a computer.

The controller 30 controls operation of individual sections; that is, the servo detection section 14 and the RF detection section 20. At the time of recording of data, the controller 30 drives the LDD circuit 32 by means of encoding recording data supplied from a higher-level apparatus. Data are recorded by modulating power through use the set recording strategy. A recording strategy is a waveform regulation for a recording pulse signal. As mentioned previously, data are recorded by effecting transition of the recording film from a crystalline state to an amorphous state through radiation of a laser beam of recording power onto the recording film. The pulse waveform of the recording power can be set arbitrarily. When data are recorded through use of a multi-pulse instead of a single pulse, recording performance is changed by changing the width and level of a leading pulse of the multi-pulse, the width and level of subsequent pulses, and intervals between pulses. A recording strategy is determined by setting the width and level of the leading pulse, the number of subsequent pulses, and a combination consisting of a pulse width and intervals between pulses. The recording strategy may be fixed to a default value or optimized. At the time of overwriting operation, a pulse of recording power is superimposed on a pulse of erasing power. Hence, the recording strategy is realized by superimposing a multi-pulse of recording power (Pw) onto a pulse of erasing power (Pe). Amorphous areas of the recording film are taken as marks, and crystalline areas of the recording film are taken as spaces. During the period of the space, the pulse of erasing power Pe is radiated. During the period of the mark, the multi-pulse of recording power Pw is radiated.

The controller 30 supplies a control signal to the rotation control section 31, thereby controlling the rotational speed of the spindle motor 11. In relation to a conventional optical disk apparatus, when the optical disk 10 is of, e.g., quadruple-speed, as defined by the specifications, the rotation control section 31 performs control operation such that quadruple-speed is achieved. In contrast, according to the embodiment, an optimal recording speed is retrieved by setting the rotational speed of the optical disk 10 to various values. The optimal recording speed is set on the basis of the erasure ratios obtained at respective recording speeds. Transition from the crystalline state to the amorphous state is effected at the time of recording of data. Hence, high-speed recording may be attained by increasing power. However, at the time of erasure operation, the recording film must be held at the crystallization temperature or higher for a given period of time or more in order to return the amorphous state to the crystalline state. Hence, a limitation is imposed on speedup. During overwriting operation, data are recorded after erasure of existing recorded data. Hence, an overwriting speed is determined by erasure performance. Attention is paid to this relationship in the embodiment; the maximum speed at which sufficient erasure performance can be achieved is retrieved, and overwriting operation is performed at this speed.

<Optimization of Rotational Speed (Overwriting Speed)>

Figure 2:
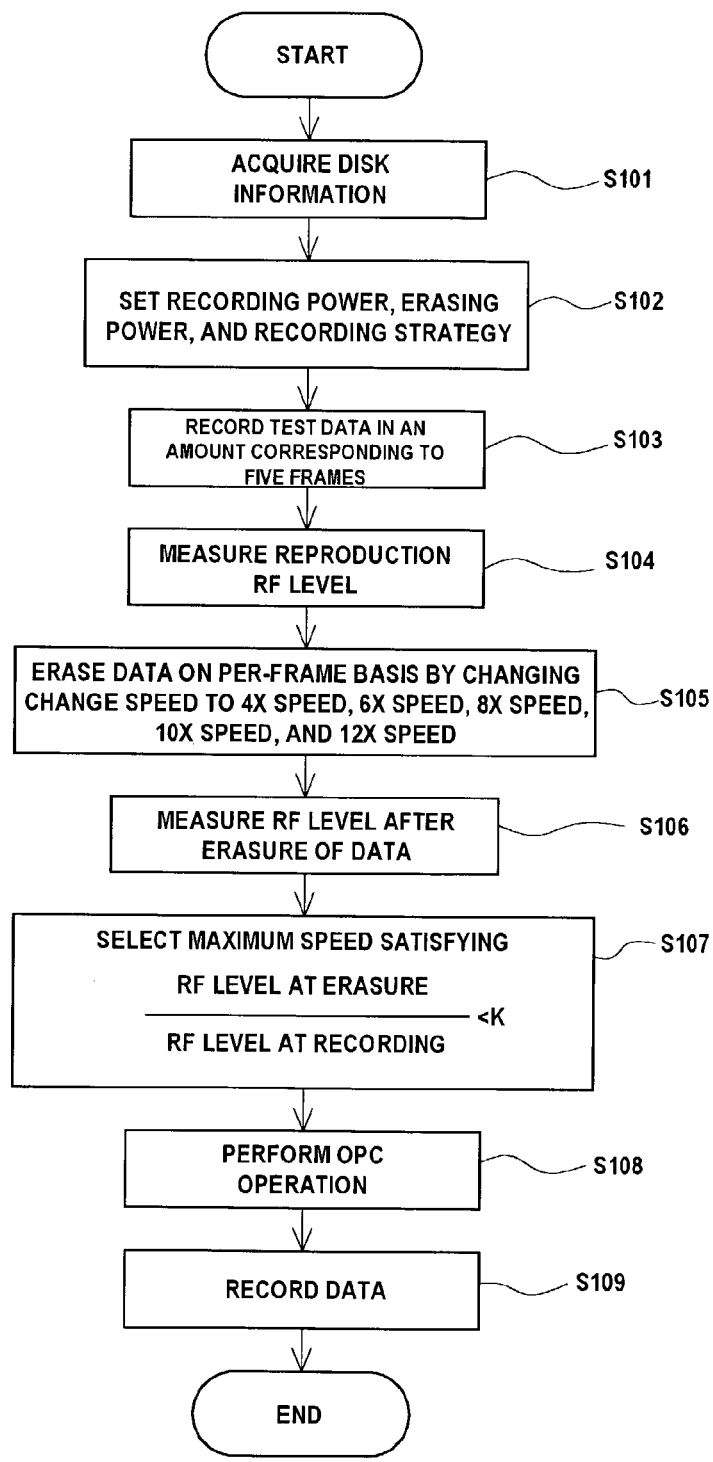
FIG. 2 is a processing flowchart for the optical disk apparatus.

FIG. 2 shows a processing flowchart of the embodiment. First, disk information recorded in a predetermined location of the optical disk 10 is acquired (S101), thereby determining standard recording power, standard erasing power, and a standard recording strategy (S102). When the name of a manufacturer is recorded as disk information, standard recording power, standard erasing power, and a standard recording strategy are recorded in the memory of the controller 30 according to the manufacturer. Recording power, erasing power, and a recording strategy may be set by reading parameters corresponding to an acquired manufacturer. In addition to these, the standard rotational speed of the optical disk 10 may also be acquired.

After the recording power, the erasing power, the recording strategy, and the rotational speed, all serving as standards, have been set, test data are recorded on only five frames of the PCA on the optical disk 10 through use of these parameters by means of the standard recording power (S103). The rotational speed of the optical disk required at the time of recording operation is set to, e.g., quadruple-speed. After the test data have been recorded on five frames, the test data are reproduced. The level of the reproduced RF signal is measured, and the thus-measured level is stored in the memory of the controller 30 (S104). Here, the erasing power required at the time of recording of the test data may be set arbitrarily. The reason for this is that no existing recorded data are present at the beginning of recording of data on the optical disk 10, and hence erasure performance does not pose any problem. Consequently, test data maybe recorded by use of only recording power.

After recording of the test data and measurement of level of the RF signal, the controller 30 controls the rotational control section 31 and erases the test data recorded over the five frames on a per-frame basis while changing the rotational speed in five steps; that is, 4× speed, 6× speed, 8× speed, 10× speed, and 12× speed (S105). The erasing power is the standard erasing power set in S102. Erasure can be effected through use of a DC laser beam of standard erasing power. After the test data have been erased at different erasure speeds, the level of the reproduced RF signal obtained after erasure of each frame is measured (S106). The controller 30 computes an erasure ratio for the case where the data have been erased at the 4× speed, an erasure ratio for the case where the data have been erased at the 6× speed, an erasure ratio for the case where the data have been erased at the 8× speed, an erasure ratio for the case where the data have been erased at the 10× speed, and an erasure ratio for the case where the data have been erased at 12× speed. The thus-computed erasure ratios are stored in the memory. The erasure ratio is computed by the equation of Erasure Ratio= (RF level at erasure)/(RF level at recording). Here, the RF level at erasure means the level of the reproduced RF signal obtained after erasure of the test data. The RF level at recording means the level of the reproduced RF signal obtained before erasure of the test data. As is evident from the equation, the erasure ratio becomes small so long as the test data have been erased sufficiently. If unerased data still remain as a result of insufficient erasure of the test data, the erasure ratio will become greater. The controller 30 computes the erasure ratios at the respective rotational speeds, and the thus-computed five erasure ratios are compared with a predetermined threshold value K (S107), where the threshold value K is a parameter for specifying tolerances on unerased data. The threshold value K is set to a value of lower than 1; e.g., a value of 0.05. If the rotational speed is excessive and unerased data still remain, the erasure ratio will become greater than the threshold value K. In contrast, if the test data have been erased sufficiently, the erasure ratio will become lower than the threshold value K. The controller 30 selects the maximum rotational speed from among the rotational speeds at which the erasure ratios become lower than the predetermined threshold value K.

Figure 3:
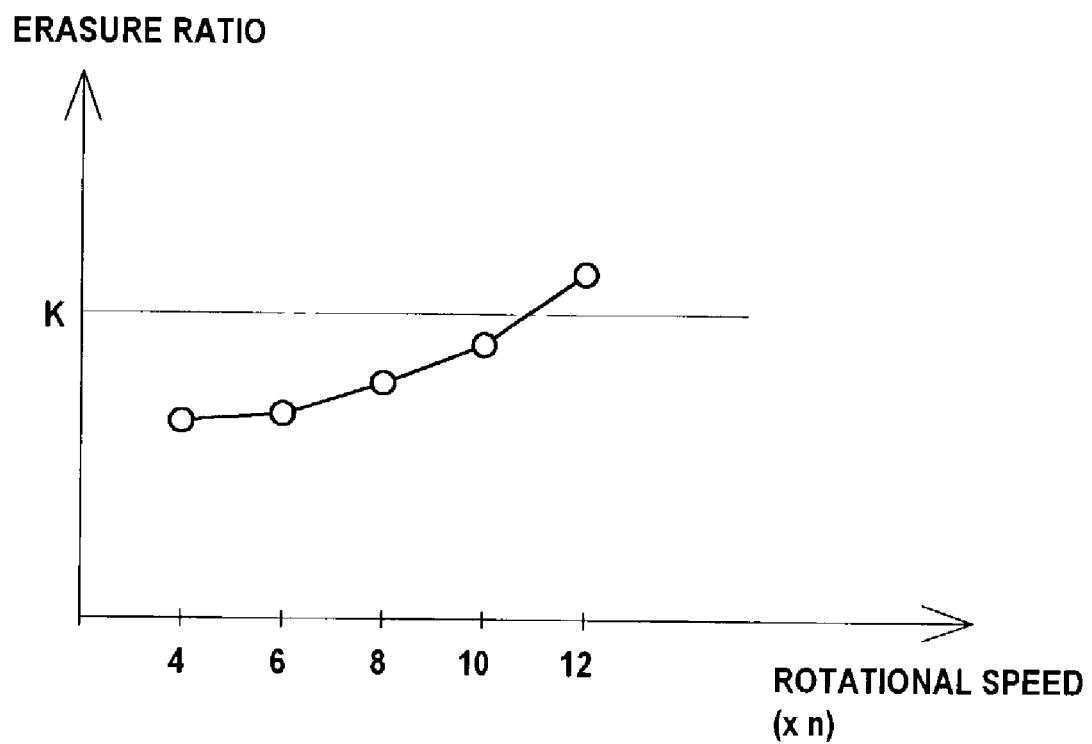
FIG. 3 is a graph showing a relationship between the rotational speed of the optical disk and an erasure ratio.

FIG. 3 shows a change in the erasure ratios with respect to the (N-fold) rotational speeds. As the rotational speed of the optical disk is increased, holding the recording film at the crystallization temperature or higher becomes difficult, thereby posing difficulty in effecting crystallization. As a result, the erasure ratio increases. As illustrated, the erasure ratios obtained at 4× speed, 6× speed, 8× speed, and 10× speed are lower than the predetermined threshold value K. When the erasure ratio has exceeded the predetermined threshold value K at 12× speed, the controller 30 selects the 10× speed, which is the maximum rotational speed among the rotational speeds whose erasure ratios are lower than the threshold value, and takes the thus-selected 10× speed as the optimum rotational speed.

Turning back to FIG. 2, after the optimal rotational speed (recording speed) has been selected on the basis of the erasure ratio in the manner mentioned above, the controller 30 performs an OPC operation (S108). Specifically, test data are recorded on the remaining frames of the PCA while the recording power is varied among various values. Optimal recording power is set on the basis of the β-values or jitter values of the reproduced signals formed from the test data. The standard erasing power set in S102 can be used as the erasing power without modification. Alternatively, the erasing power may be reset by multiplying the recording power optimized through the OPC by a given coefficient. Even when some change is made to the erasing power, no significant influence is exerted on the erasure performance, and the optimal rotational speed selected in S107 is valid. After the recording power has been optimized in the previously-described manner, data are recorded (or overwritten) in a data area of the optical disk 10 at the optimal recording speed set in S107 (S109).

As mentioned above, in the embodiment, the recording speed required at the time of overwriting operation is optimized. Hence, an optical disk apparatus which is of, e.g., quadruple-speed as defined by the specifications can effect overwriting operation without fail at that recording speed or higher, thus satisfying a demand for high-speed recording.

Although the embodiment of the invention has been described thus far, the invention is not limited to the embodiment and is susceptible to various modifications.

Figure 4:
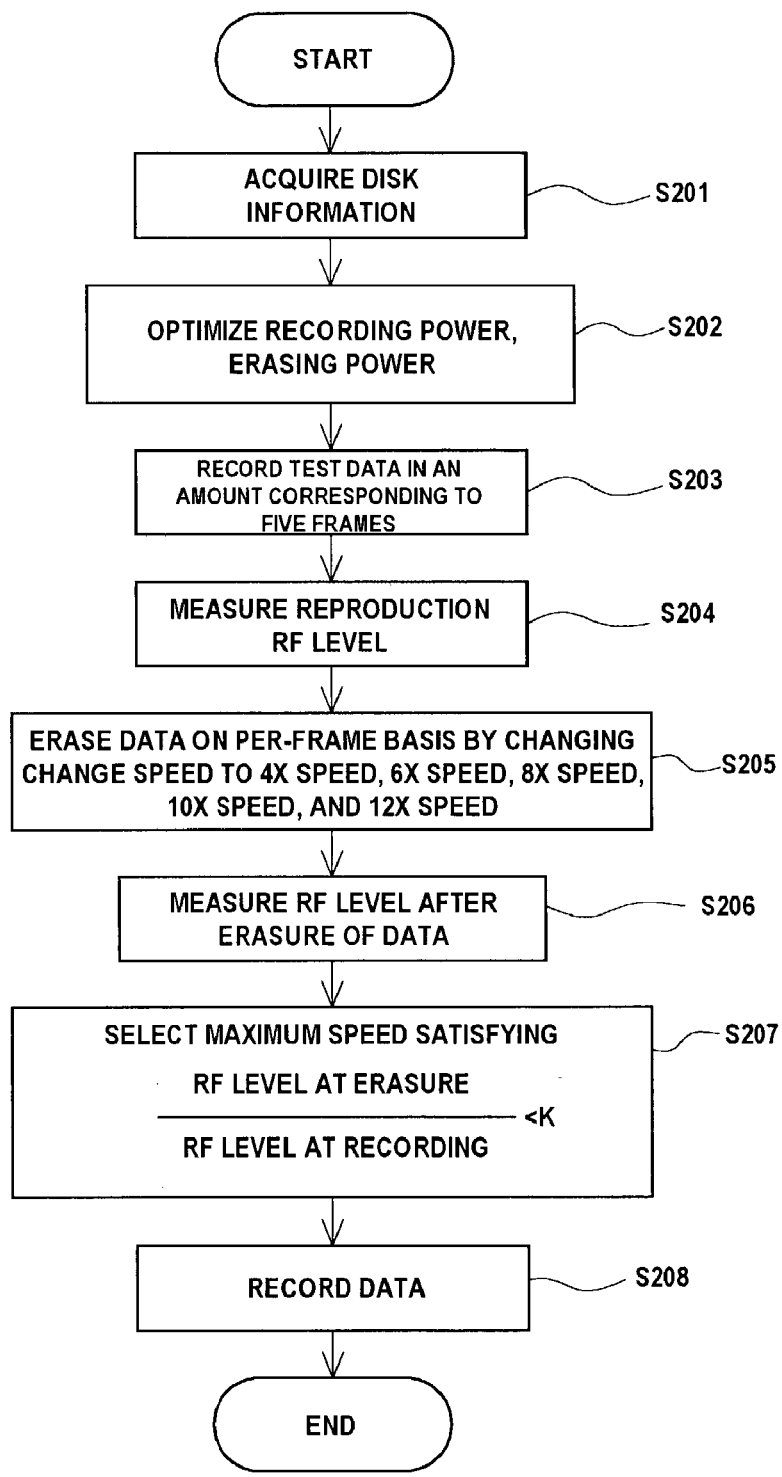
FIG. 4 is another processing flowchart for the optical disk apparatus.

For example, the test data are recorded by setting the recording power and the erasing power in S102. However, processing pertaining to S103 to S107 may be performed by means of optimizing the recording power and the erasing power through the OPC operation being performed by use of only a predetermined number of frames on the optical disk 10 of the PCA, and through use of the thus-optimized recording and erasing power. At the time of optimization of the erasing power, the erasure ratio may be measured and optimized by setting the erasing power to various values in addition to computing the erasing power by multiplying the optimal recording power by a predetermined coefficient that is lower than 1. FIG. 4 is a flowchart of the previously-described processing. First, the controller 30 acquires disk information stored beforehand in a predetermined area of the optical disk 10 (S201) At this time, the name of a manufacturer, a standard rotational speed, and a standard recording strategy, all being recorded on the optical disk 10, are acquired. Next, the optical disk 10 is rotationally driven at the standard rotational speed, thereby optimizing recording and erasing power by means of performing the OPC operation (S202). The recording power is optimized in the following manner, for example. When the standard rotational speed is set to 4× speed, test data are recorded in the PCA of the optical disk 10 which is spinning at 4× speed, at various levels of recording power. The test data are then reproduced at reproducing power, and optimal recording power is selected on the basis of the quality (e.g., jitter) of the signal. Erasing power is optimized in the following manner, for example. Test data are recorded over a plurality of frames of the PCA on the optical disk 10 at the optimal recording power. The test data are then reproduced at the reproducing power, and the levels of the respective reproduced RF signals are detected. Next, the test data are erased by setting the erasing power to various levels. The levels of the reproduced RF signals obtained after erasure are detected at each erasing power level. The erasure ratio is computed for each erasing power level, and the erasing power involving the minimum erasing ratio is selected as the optimal erasing power. Alternatively, the optimal erasing power may be computed by means of an equation (Optimal Erasing Power)=k×(Optimal Recording Power), where k<1.

After the recording and erasing power have been optimized, the test data are recorded over five frames of the PCA on the optical disk 10 at the optimal recording power (S203). The test data are reproduced, and the levels of the reproduced RF signals are detected (S204). When the levels of the RF signals reproduced from the test data that have been recorded at the optimal recording power have already been detected, these levels can be used at the time of optimization of the erasing power. Therefore, processing pertaining to S204 can be omitted. Next, the test data are erased on a per-frame basis at the optimal erasing power while sequentially changing the rotational speed of the optical disk 10 to 4× speed, 6× speed, 8× speed, 10× speed, and 12× speed (S205). More specifically, the test data on a certain frame are erased at the optimal erasing power while the optical disk 10 is held at 4× speed. Next, the rotational speed of the optical disk 10 is increased to 6× speed, and the test data on the next frame are erased at the optimal erasing power. Erasure of the test data and increase of rotational speed are repeated in the same manner. Since erasure of the test data at 4× speed has already been performed during optimization of the erasing power, an operation for erasing the test data at 4× speed can be omitted.

After erasure of the test data at the respective rotational speeds has been performed, the levels of the reproduced RF signals obtained at the respective rotational speeds are detected (S206) The erasure ratios are computed for the respective rotational speeds. The levels of the reproduced RF signals obtained after erasure of the test data are detected by rotationally driving the optical disk 10 at the standard rotational speed employed at the time of reproduction. The erasure ratios obtained at the respective rotational speeds are compared with the threshold value K, and the maximum rotational speed satisfying Erasure Ratio<K is selected (S207).

After selection of the maximum rotational speed, the thus-selected rotational speed is set as the rotational speed for overwriting operation, and data are recorded (overwritten) in the data area of the optical disk 10 (S208).

In the embodiment, the ratio of (RF level at erasure)/(RF level at recording) is employed as an erasure ratio. However, this is merely an example of the erasure ratio. An arbitrary expression which enables evaluation of erasing performance can be defined as the erasure ratio. For example, Erasure Ratio=(RF level at recording)/(RF level at erasure) may also be employed. In this case, the erasure ratio becomes greater as erasure operation is performed. Therefore, the only requirement is to select the maximum rotational speed which is greater than a predetermined threshold value. Further, instead of the reproduced RF signal, another physical quantity may also be employed at the time of evaluation of erasure performance. For example, instead of the test data being erased by the DC laser beam, another set of test data may be written over the test data by superimposing the recording power pulse on the erasing power pulse. Erasure performance may be evaluated by measuring an error rate or a signal-to-noise ratio, which is obtained after overwriting operation.

Figure 5:
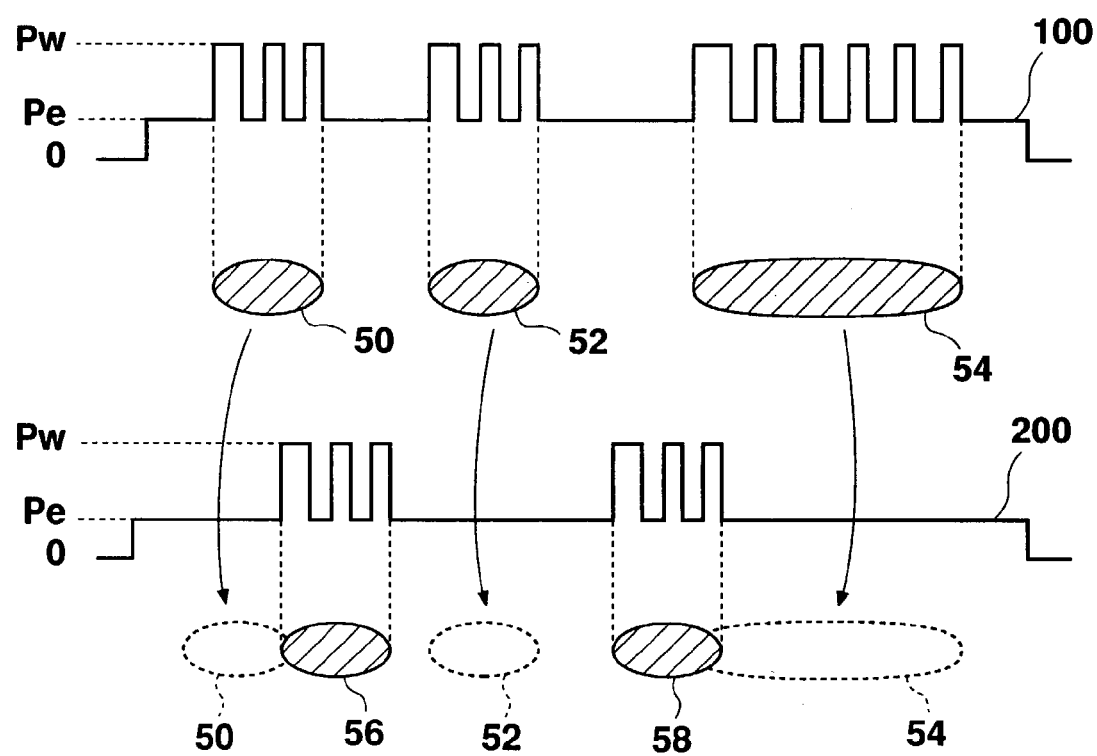
FIG. 5 is a descriptive view showing a relationship between a recording pulse and marks.

FIG. 5 shows processing to be performed when test data are recorded in a certain frame of the PCA on the optical disk and when another set of test data are written over the data in the same frame. Test data are recorded by use of a recording pulse 100 of the test data. The recording pulse is formed by superimposing the multi-pulse of recording power Pw on the pulse of erasing level Pe. The area exposed to the laser beam of erasing power Pe is transformed to a space (i.e., a crystalline state), and the area exposed to the laser beam of recording power Pw is transformed to a mark (i.e., an amorphous state) The drawing shows marks 50, 52, and 54. Another set of test data is recorded in the same frame by use of another recording pulse 200. The recording pulse 200 also has the erasing power Pe and the recording power Pw. If the rotational speed of the optical disk 10 is sufficiently low with respect to the erasing power Pe, all the existing recorded data; that is, the marks 50, 52, and 54, are erased by means of the erasing power Pe. Only marks 56, 58 are formed in the area exposed to the recording pulse 200 of recording power Pw. However, when the rotational speed of the optical disk 10 is too high, the marks 50, 52, and 54 cannot be erased completely by means of the erasing power Pe; unerased data still remain as indicated by broken lines shown in FIG. 5. Existence of such unerased data results in deterioration of an error rate and signal-to-noise ratio of the reproduced signal obtained after overwriting of the data. Therefore, the appropriateness of rotational speed of the optical disk 10 can be evaluated by reference to the error rate and the signal-to-noise ratio.

In the embodiment, the erasure ratio is computed by changing the rotational speed of the optical disk 10, which is of quadruple-speed as defined by specifications, to 4× speed, 6× speed, 8× speed, 10× speed, and 12× speed. However, the rotational speed can also be increased and decreased with reference to the speed defined by the specifications. For instance, the rotational speed is changed in four steps; that is, 6× speed, 8× speed, 10× speed, and 12× speed with respect to the optical disk, which is of 10× speed as defined by the specifications. Sensitivity of the recording film varies from optical disk 10 to another optical disk 10. There may be an optical disk 10 over which data cannot be written at the rotational speed defined by the specifications. In such a case, the conventional optical disk apparatus determines such an optical disk to be unrecordable. The erasure performance is evaluated at a rotational speed lower than that defined by the specifications, thereby enabling overwriting of data onto the optical disk 10 which has been determined to be an unrecordable disk error. Thus, the versatility of the optical disk apparatus with regard to the optical disk 10 is increased.

In the embodiment, test data are recorded at the rotational speed of the optical disk 10 defined by the specifications. Even at the time of recording of the test data, the test data can also be recorded on a per-frame basis at 4× speed, 6× speed, 8× speed, 10× speed, and 12× speed. In this case, the test data recorded at 4× speed are erased at 4× speed; the test data recorded at 6× speed are erased at 6× speed; the test data recorded at 8× speed are erased at 8× speed; . . . . Since erasing and recording operations are performed at the same rotational speed during overwriting operation, this manner of operation is also preferable. When test data are recorded at n×rotational speeds, the recording power used for recording the test data may be changed in accordance with a proportion of the n×rotational speeds with respect to the rotational speed defined by the specifications.

Figure 6:
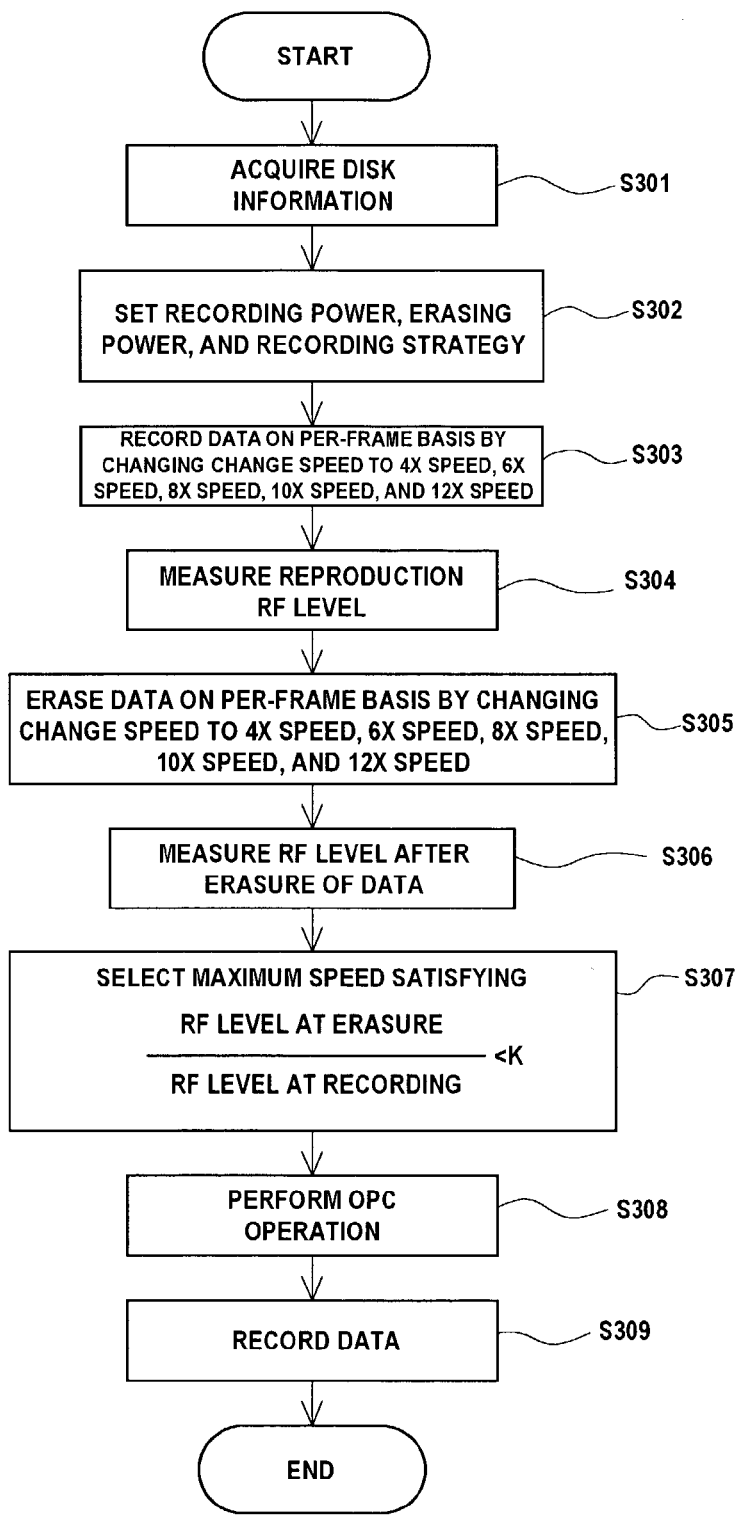
FIG. 6 is yet another processing flowchart for the optical disk apparatus.

FIG. 6 shows a flowchart of the foregoing processing. First, the controller 30 acquires disk information recorded beforehand in the predetermined area of the optical disk 10 (S301). On the basis of the information acquired in S301, the standard recording power, the standard erasing power, the standard rotational speed (e.g., quadruple-speed), and the standard recording strategy are set (S302).

Next, the test data are recorded on a per-frame basis by increasing the rotational speed of the optical disk 10 sequentially from 4× speed, 6× speed, 8× speed, 10× speed, and 12× speed (S303) Specifically, the optical disk 10 is driven at quadruple-speed, whereby the test data are recorded in a certain frame of the PCA by means of the standard recording power. After recording of the test data, the rotational speed is increased to 6× speed, whereupon the test data are recorded in the next frame by means of the standard recording power. The rotational speed is increased to 8× speed, and the test data are recorded in the next frame by means of the standard recording power. These operations are repeated according to the same pattern, thereby recording the test data for each rotational speed. Alternatively, at the time of recording of test data for each rotational speed, the recording power may be changed for each rotational speed instead of the test data being recorded by means of the same standard recording power. For example, under the assumption that the standard recording power at quadruple speed is taken as Pwr, recording power for 6× speed is 6/4×Pwr; recording power for 8× speed is 8/4×Pwr; recording power for 10× speed is 10/4×Pwr; and recording power for 12× speed is 12/4×Pwr. When the recording power computed by these expressions exceeds the maximum allowable power of the LD, the recording power is taken as the maximum allowable power.

After the test data have been recorded for each rotational speed, the test data are reproduced, thereby detecting the levels of the reproduced RF signals for the respective rotational speeds (S304). The test data are erased by means of the standard erasing power by varying rotational speed of the optical disk 10 sequentially from 4× speed, 6× speed, 8× speed, 10× speed, and 12× speed (S305). Specifically, the frame in which the test data have been recorded at 4× speed is subjected to erasure at 4× speed, and the frame in which the test data have been recorded at 6× speed is subjected to erasure at 6× speed. When the test data are erased for each rotational speed, the erasing power may be changed in accordance with the rotational speed instead of the test data being erased by means of the same standard erasing power, as in the case of recording of the test data. As a matter of course, when the recording power is changed in accordance with the proportion of the respective rotational speeds, computing the erasing power for each rotational speed by multiplying the recording power of each rotational speed by a constant "k" (k<1) is also preferable.

After erasure of the test data for each rotational speed, the RF levels obtained after erasure of the test data are detected (S306). The erasure ratio is computed for each rotational speed, and the thus-computed erasure ratio is compared with the threshold value K. The maximum rotational speed which attains erasure ratio<K is selected (S307). The thus-selected rotational speed is set as the rotational speed for overwriting operation. Subsequently, the OPC operation is performed, thereby optimizing the recording power (and the erasing power as well) (S308). The data supplied from the host computer or the like are recorded by means of the recording power optimized in S308 (the erasing power as well) (S309). Here, the host computer corresponds to a personal computer when the optical disk apparatus of the embodiment is loaded into a personal computer.

In the embodiment, the maximum rotational speed which attains an erasure ratio lower than the threshold value K is selected from among 4× speed, 6× speed, 8× speed, 10× speed, and 12× speed. The maximum rotational speed can also be computed from the relationship between the rotational speed and the erasure ratio, by means of linear interpolation. Specifically, the relationship between a rotational speed and the erasure ratio is plotted. The maximum rotational speed at which the erasure ratio becomes equal to the threshold value is computed, and the thus-computed rotational speed is set as the optimal rotational speed.

Further, in the embodiment, Erasure Ratio is defined as (RF level at erasure)/(RF level at recording). The maximum rotational speed which attains an erasure ratio lower than the threshold value K is set to the maximum rotational speed for overwriting operation. The second largest rotational speed from among the rotational speeds which attain an erasure ratio lower than the threshold value K may be set as the optimal rotational speed at the time of overwriting operation, in order to ensure a recording margin in consideration of variations in the sensitivity of the recording film of the optical disk 10. Alternatively, a difference value is computed for each rotational speed by means of the equation of Difference value=(threshold value K−erasure ratio). A rotational speed whose difference value is positive and falls within a given allowable range may be set as the optimal rotational speed. This processing can be expressed as 0<δ1<difference value<δ2. Here, δ1 is taken as the lower limit value of the allowable range, and δ2 is taken as the upper limit value of the same. δ1 is a parameter which varies with the recording margin. These processing operations are fulfilled by means of the controller 30 consecutively executing processing programs stored in the ROM.

In the embodiment, the rotational speed of the optical disk 10 is changed sequentially from 4× speed, 6× speed, 8× speed, 10× speed, and 12× speed. However, these operations can be made more simple. In a simpler operation, the erasure ratio is evaluated by means of a rotational speed obtained by multiplying a rotational speed defined by the specifications by a certain coefficient "n" (n>1). For example, when the rotational speed defined by the specifications is 4× speed, the optical disk 10 is driven at 6× speed with n=1.5, thereby computing the erasure ratio at which the test data are to be erased. The thus-computed erasure ratio is compared with the threshold value K. When the erasure ratio obtained at 6× speed is lower than the threshold value K, data are subjected to overwriting at 6× speed. When the erasure ratio obtained at 6× speed becomes greater than the threshold value K, data are subjected to overwriting at 4× speed defined by the specifications.

Figure 7:
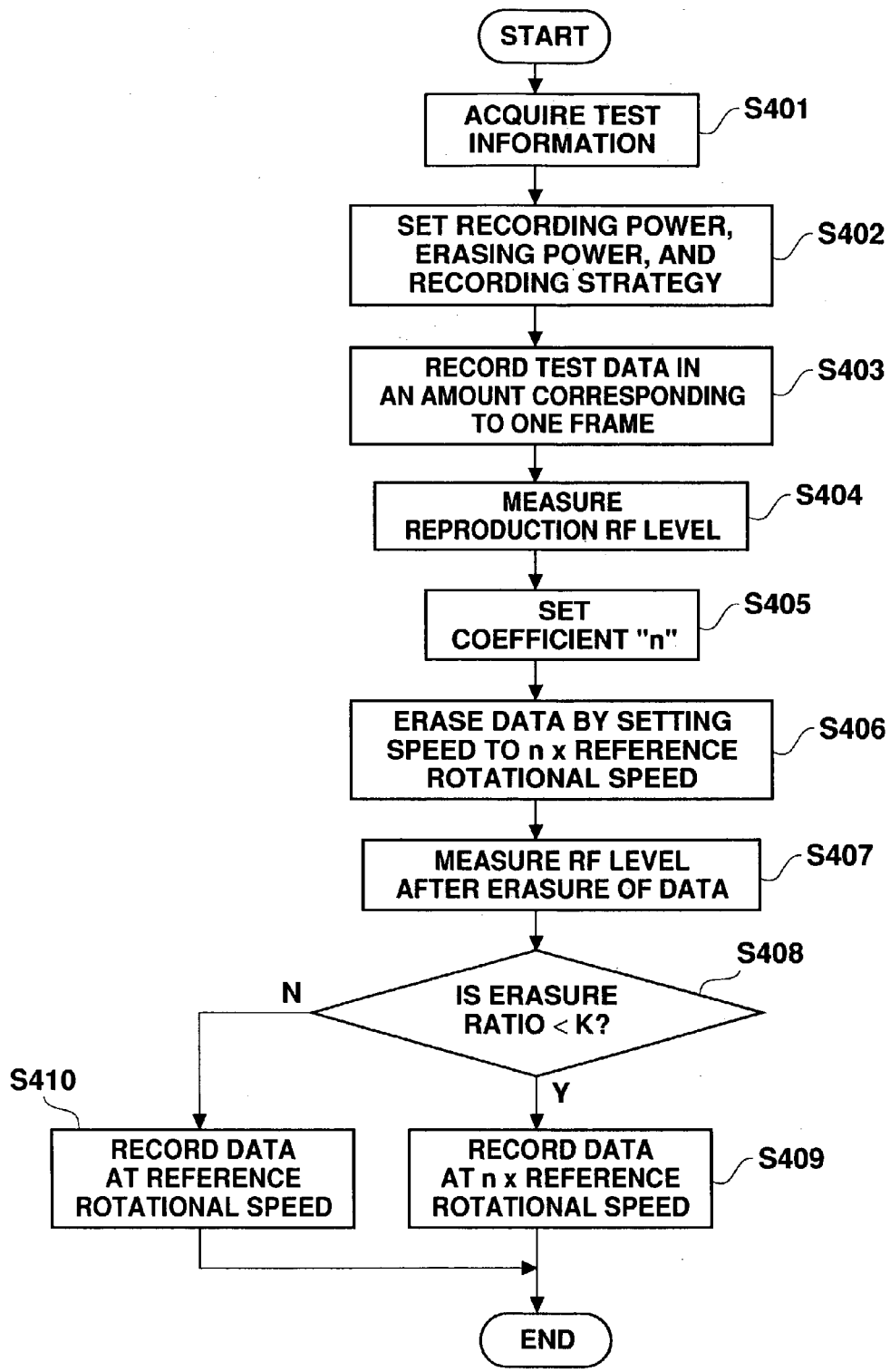
FIG. 7 is still another processing flowchart for the optical disk apparatus.

FIG. 7 shows a flowchart of the above-described processing. First, the controller 30 acquires disk information recorded beforehand in the predetermined area of the optical disk 10 (S401) On the basis of the disk information, the standard recording power, the standard erasing power, the standard recording strategy, and the standard rotational speed are set (S402). Next, the test data are recorded in only one frame of the PCA on the optical disk 10 by means of the standard recording power (S403). The reason why the test data are recorded in only one frame can be presumed to be that the erasure ratio obtained at the standard rotational speed is lower than the threshold value K. The only requirement is to test one rotational speed with reference to the standard rotational speed. After the test data have been recorded in only one frame, the test data are reproduced, and the levels of the reproduced RF signals are detected (S404).

Next, the controller 30 sets the coefficient "n" (S405). Although the coefficient "n" can be stored in the ROM of the controller 30 beforehand, the coefficient may be supplied to the controller 30 by means of arbitrary setting effected by the user of the optical disk apparatus. When the coefficient "n" is supplied by the user, providing the optical disk apparatus with an operation switch for controlling a rotational speed is preferable. The user actuates the operation switch, thereby arbitrarily setting the coefficient "n." Under the assumption that the standard rotational speed is 4× and the speed has been changed to 6× speed by the user actuating the operation switch, the coefficient "n" is set to a value of 1.5. When the user sets the rotational speed to 12× speed, the coefficient is set to n=3.

After setting of the coefficient "n," the controller 30 sets the rotational speed of the optical disk 10 to the n×standard rotational speed, thereby erasing the test data (S406). The level of the reproduced RF signal obtained after erasure of the test data is detected (S407), and a determination is made as to whether or not the erasure ratio is lower than the threshold value K (S408). If the erasure ratio obtained at the n×standard rotational speed is lower than the threshold value K, the controller 30 records data by setting the optimal rotational speed obtained at the time of overwriting operation to the n×standard rotational speed (S409). In contrast, when the erasure ratio is higher than the threshold value K, a determination is made that the data cannot be written over the existing data sufficiently at the n×reference rotational speed, and the optical rotational speed is set to the original standard rotational speed (S410). In the embodiment, the only requirement is to record the test data in only one frame. Therefore, efficiently use of the PCA of the optical disk 10 can be realized.

In FIG. 7, processing for setting the coefficient "n" to be performed in S405 may be carried out prior to processing for recording the test data to be performed in S403. The test data may be recorded by means of the n×standard recording power. Alternatively, at this time, the recording power may be set so as to become equal to the n×standard recording power. Moreover, in S406 the erasure power may also be set to the n×standard recording power or a k×n×standard recording power.

What is claimed is:

1. An optical disk apparatus which enables overwriting of data, comprising:
   means for recording test data in a predetermined area of an optical disk;
   means for erasing said test data by changing a rotational speed of said optical disk;
   means for setting an optimal rotational speed in accordance with a level of erasure of said test data when said rotational speed has been changed; and means for overwriting of data into a data area of said optical disk at said optimal rotational speed.

2. The apparatus according to claim 1, wherein
said means for erasing said test data erases said test data by changing said rotational speed of said optical disk in two steps or more including at least a standard rotational speed; and
said means which performs setting sets said optimal rotational speed by comparing, with a threshold value, at least a level of erasure obtained at a rotational speed other than said standard rotational speed.

3. The apparatus according to claim 1, wherein
said level of erasure is a ratio between a reproduced RF level of test data obtained before erasure and a reproduced RF level of test data obtained after erasure; and
said means which performs setting sets said optimal rotational speed by comparing said ratio with a threshold value.

4. The apparatus according to claim 3, wherein
said ratio is defined as
Ratio=RF level of Test Data reproduced after erasure/RF level of Test Data reproduced before erasure; and
said means which performs setting sets, as said optimal rotational speed, a rotational speed at which said proportion becomes lower than said threshold value.

5. The apparatus according to claim 3, wherein
said ratio is defined as
Ratio=RF level of Test Data reproduced after erasure/RF level of Test Data reproduced before erasure; and
said means which performs setting sets, as said optimal rotational speed, a maximum rotational speed from among rotational speeds at which said ratio is lower than said threshold value.

6. The apparatus according to claim 3, wherein
said means which performs setting sets, as said rotational speed, a rotational speed at which a difference value between said threshold value and said ratio falls within a predetermined range.

7. The apparatus according to claim 3, wherein
said ratio is defined as
Ratio=RF level of Test Data reproduced before erasure/ RF level of Test Data reproduced after erasure; and
said means which performs setting sets, as said optimal rotational speed, a rotational speed at which said ratio is greater than said threshold value.

8. The apparatus according to claim 1, wherein
said means for erasing said test data erases said test data by means of fixing erasing power.

9. The apparatus according to claim 1, wherein said means for erasing said test data erases said test data by changing erasing power in accordance with said rotational speed.

10. The apparatus according to claim 1, wherein
said means for recording said test data records said test data by fixing said rotational speed of said optical disk to a standard rotational speed.

11. The apparatus according to claim 1, wherein
said means for recording said test data records said test data by changing said rotational speed of said optical disk; and
said means for erasing said test data erases said test data at a rotational speed identical with the rotational speed at which said test data have been recorded.

12. The apparatus according to claim 11, wherein
said means for recording said test data records said test data by fixing recording power.

13. The apparatus according to claim 11, wherein
said means for recording said test data records said test data by varying recording power in accordance with said rotational speed.

14. The apparatus according to claim 11, wherein
said means for recording said test data records said test data by varying recording power in accordance with said rotational speed; and
said means for erasing said test data erases said test data by varying erasing power in accordance with said rotational speed.

15. The apparatus according to claim 14, wherein
said erasing power is set by multiplying said recording power by a predetermined coefficient.

16. An optical disk apparatus which records data by means of transition between an amorphous state and a crystalline state, comprising:
a spindle motor for rotationally driving an optical disk;
a pickup which records test data in a predetermined area of said optical disk by means of radiating a laser beam of recording power to said area and erases said test data by means of radiating a laser beam of erasing power; and
a controller which varies a rotational speed of said optical disk by controlling said spindle motor, sets an optimal rotational speed by comparing, with a predetermined allowable value, levels of erasure which are obtained by erasing said test data with said pickup while said rotational speed of said optical disk is varies in a plurality of steps, and controls said spindle motor so as to achieve said optimal rotational speed.

17. The apparatus according to claim 16, wherein
said pickup writes data over a data area of said optical disk which is rotationally driven at said optimal rotational speed, through use of a recording pulse formed by superimposing a pulse of said recording power onto a pulse of said erasing power.

18. The apparatus according to claim 16, wherein
said controller sets said rotational speed of said optical disk to a standard rotational speed when said test data are recorded and sets said rotational speed of said optical disk to a rotational speed which is greater than or equal to said standard rotational speed when said test data are erased; and
said pickup sets said recording power to standard recording power when said test data are recorded and sets said erasing power to standard erasing power when said test data are erased.

19. The apparatus according to claim 16, wherein
said controller sets said rotational speed of said optical disk to a standard rotational speed when said test data are recorded and sets said rotational speed of said optical disk to a rotational speed which is greater than or equal to said standard rotational speed when said test data are erased; and
said pickup sets said recording power to optimal recording power when said test data are recorded and sets said erasing power to optimal erasing power when said test data are erased.

20. The apparatus according to claim 16, wherein
said controller sets said rotational speed of said optical disk to a rotational speed which is greater than or equal to a standard rotational speed when said test data are recorded and sets said rotational speed of said optical disk to a rotational speed which is greater than or equal to said standard rotational speed when said test data are erased; and said pickup sets said recording power to standard recording power when said test data are recorded and sets said erasing power to standard erasing power when said test data are erased.

21. The apparatus according to claim 16, wherein
said controller sets said rotational speed of said optical disk to a rotational speed which is greater than or equal to a standard rotational speed when said test data are recorded and sets said rotational speed of said optical disk to a rotational speed which is greater than or equal to said standard rotational speed when said test data are erased; and said pickup sets said recording power to optimal recording power when said test data are recorded and sets said erasing power to optimal erasing power when said test data are erased.

* * * * *

UNITED STATES PATENT AND TRADEMARK OFFICE
CERTIFICATE OF CORRECTION

| | | Page 1 of 1 |
|---|---|---|
| PATENT NO. | : 7,035,184 B2 | |
| APPLICATION NO. | : 10/405755 | |
| DATED | : April 25, 2006 | |
| INVENTOR(S) | : N. Takeda | |

It is certified that error appears in the above-identified patent and that said Letters Patent is hereby corrected as shown below:

| COLUMN | LINE | |
|---|---|---|
| 14 | 29 | "is varies" should read --is varied-- |
| (Claim 16, | line 15) | |

Signed and Sealed this

Fourteenth Day of November, 2006

JON W. DUDAS
*Director of the United States Patent and Trademark Office*